July 7, 1953  M. P. GRAHAM  2,644,702
CLAMP POSITIONER
Filed Aug. 19, 1950
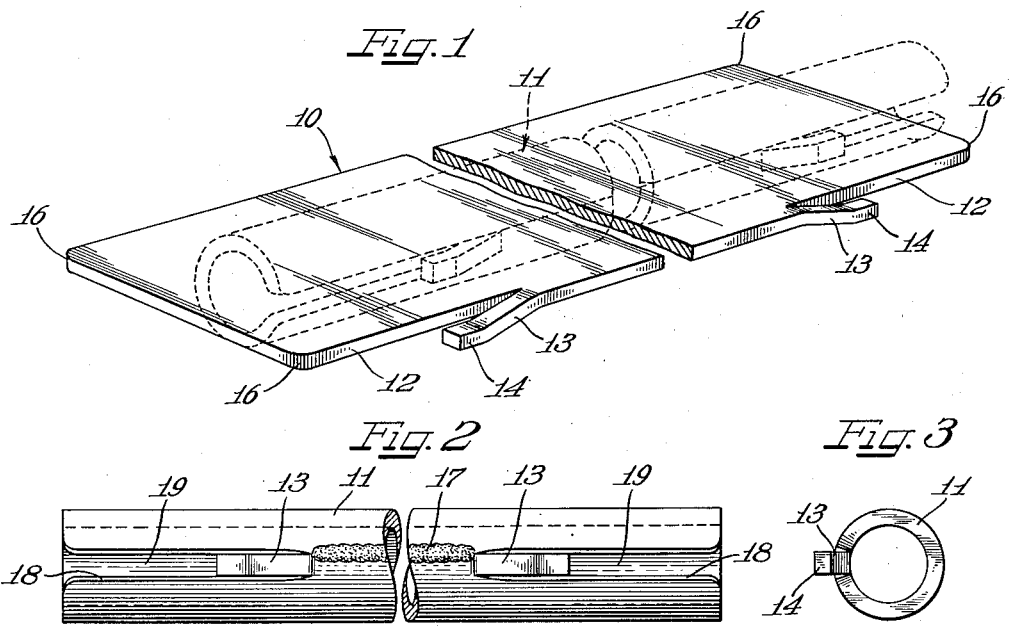
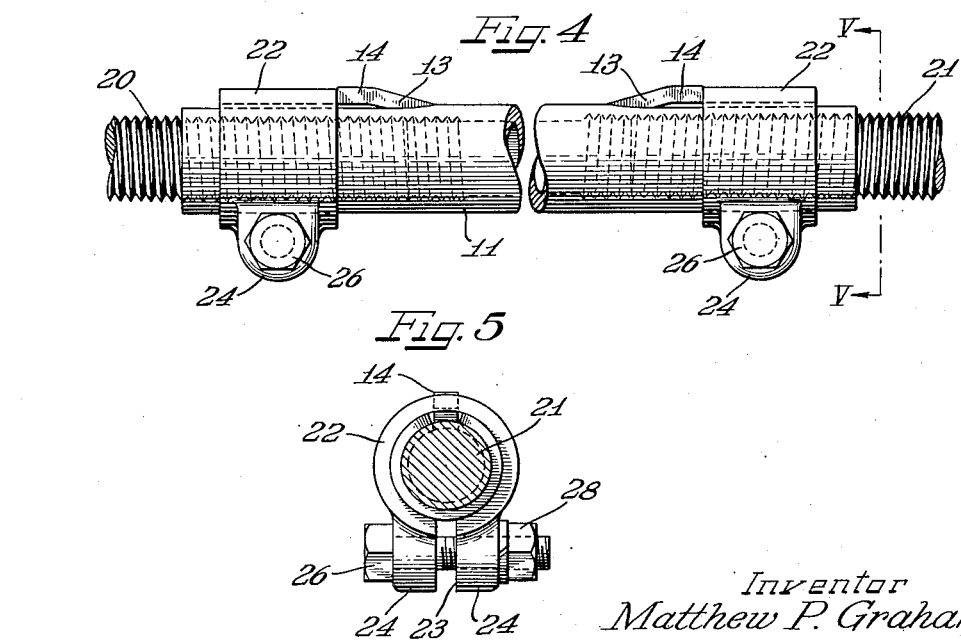
Inventor
Matthew P. Graham
by The Firm of Charles W. Kidd
Attys Patented July 7, 1953

2,644,702

UNITED STATES PATENT OFFICE 2,644,702

CLAMP POSITIONER

Matthew P. Graham, Detroit, Mich., assignor to Thompson Products, Inc., Cleveland, Ohio, a corporation of Ohio Application August 19, 1950, Serial No. 180,423

1 Claim. (Cl. 287—60)

This invention relates to a clamp positioner for a clamp and tube assembly and to a method of making the positioner wherein clamps can be correctly and positively positioned on a tube to insure proper location of the clamp when tightened.

More specifically, the invention deals with slotted end tubes having turned-out lugs located in the axially inward end portions of the slots to provide abutments for preventing the sliding of the clamp too far inwardly on the tube and thus decreasing the locking effect.

According to this invention the positioner is formed by curling a piece of strip metal into the shape of a tube. The strip is formed with an elongated cut-out portion or recess along one side edge at each end portion thereof. A longitudinal tongue or lug is formed from the metal of the strip at the inner end of the longitudinal recess and has an offset outer end portion extending outwardly in a plane substantially parallel to that of the strip. When the strip is curled into tubular shape, the outer end portion of the tongue has its radially outward surface outside the outside diameter of the tube. A clamping ring surrounds each of the slotted end portions for contracting the same. The outer end of the tongue abuts the clamping ring to prevent sliding of the clamp too far inwardly and to properly space the clamp on the tube.

A special feature of this invention lies in the ease with which the tube may be formed in that no additional parts and no additional operations are involved. The same forming dies which are used to form conventional tubes of this type can be utilized by making a slight alteration in the shape of said dies.

It is, then, an object of this invention to provide a clamp positioner for a clamp and tube assembly which may be readily formed by making a simple alteration in conventional tube-making dies.

A further object of the invention is to provide a contractible tube with clamp positioners.

A still further object of the invention is to provide a clamp and tube assembly having integral clamp retainers wherein a clamping ring surrounding a tube is prevented from sliding too far inwardly on said tube.

Another object of the invention is to provide a method of forming a slotted adjusting tube with a clamp abutting tongue located axially inwardly in the slot.

Other and further objects of the invention will be apparent to those skilled in the art from the following detailed description of the annexed sheet of drawings which, by way of a preferred example only, illustrate one embodiment of the invention.

On the drawings:

Figure 1 is a perspective view of a blank for forming a tube according to the present invention and showing in dotted outline how the tube is rolled from the blank;

Figure 2 is a plan elevational view of the tube;

Figure 3 is an end elevational view of the tube shown in Figure 2;

Figure 4 is a side elevational view of the tube shown in Figure 2 with clamping rings assembled over the slotted ends thereof and with fragmentary portions of connecting members assembled in the ends thereof; and Figure 5 is an end view taken along line V—V of Figure 4 showing a connecting member in section.

As shown on the drawings:

In Figure 1 is shown a perspective view of a substantially flat formed blank or strip 10 with a superimposed phantom drawing of an adjusting tube or sleeve 11 shown superimposed thereon. The blank 10 has a recess or groove 12 formed longitudinally inwardly from each end along one side edge thereof. At the inward portion of each of the recesses 12 is formed a longitudinally outwardly extending finger lug or tongue 13. The fingers 13 are offset downwardly from the metal of the blank 10 and are of the same width as the recesses 12. The fingers 13 have outward end portions 14 which preferably have their upper surfaces in approximately the same plane as the lower surface of the main portion of the body 10. Rounded corners 16 are provided at the four corners of the blank 10.

It will be readily understood that the blank 10 may be easily and expeditiously formed by the use of dies as utilized for forming such a blank in the production of conventional tubing by making a simple alteration in the dies to provide for forming the fingers 13 contemporaneously with the forming of the recesses 12.

The formed blank 10 is rolled or curled into tubular shape with the fingers 13 lying in offset positions radially outwardly of the formed tube 11 as best seen in Figures 3 and 4. With the blank 10 rolled into tubular shape, the abutting side edges are fixedly joined as by welding 17. A slot 18 is formed at each end of the tube 11 between the opposing side edges of the recesses 12 and the corresponding opposite edges of the outer side of the blank 10. Internal threads 19 are formed inwardly from each end of the tube 11 and extend substantially to the center thereof, righthand threads at one end and lefthand threads at the other.

The finished adjusting tube 11 is shown in Figures 4 and 5 with connecting members 20 and 21 threadedly inserted in the respective ends thereof. Clamps or clamping rings 22 having longitudinal slots 23 with opposed ears 24 therealong are assembled over the slotted end portions of the tube 11. Each of the clamps 22 is provided with a bolt 26 which is inserted through holes in the ears 24 across the slot 23 and has a lock washer 27 and a nut 28 thereon for tightening of the clamp 22 about the slotted end portion of the tube 11 for tightening the same about the connecting members 20 and 21.

It is to be noted that the axially inward edges of the clamping rings 22 abut the end portions 14 of the fingers 13 to properly position the clamp about the end portion of the tube 11 in order to effect positive clamping action for retaining the connecting members within the ends of the tube. Thus, the fingers 13 provide positive stops for preventing the sliding of the clamp too far inwardly on the tube and thus decreasing the locking effect.

From the above description, it will be understood that this invention provides a simple, inexpensive clamp and tube assembly wherein the tube is provided with a positive stop to properly position the clamping rings on the slotted end portions of the tube. The tubes of this invention may be easily and readily formed by using slightly altered dies from those utilized in forming conventional tubes of this type.

It will be understood that modifications and variations may be effected without departing from the scope of the novel concepts of the present invention.

I claim as my invention:

In a tubular clamping structure, a tube comprising a single curled sheet with longitudinally juxtaposed edges extending only part way of the length of the tube, the remaining part having a longitudinally extending gap, the junction of said gap and said abutting edges being defined by a finger offset laterally from one of said abutting edges and radially outwardly through and out of said gap with its end turned lengthwise of the tube over and spaced from said gap and terminating in an abutment edge at right angles to the tube.

MATTHEW P. GRAHAM.

References Cited in the file of this patent

UNITED STATES PATENTS

| Number | Name | Date |
|---|---|---|
| 2,039,973 | Morgan | May 5, 1936 |
| 2,146,149 | Leighton | Feb. 7, 1939 |
| 2,178,858 | Hufferd | Nov. 7, 1939 |
| 2,202,909 | Hufferd et al. | June 4, 1940 |
| 2,227,648 | Hufferd | Jan. 7, 1941 |
| 2,391,101 | Odin | Dec. 18, 1945 |
| 2,526,470 | Gauthier | Oct. 17, 1950 |